United States Patent Office 2,798,844
Patented July 9, 1957

2,798,844

ELECTROLYTE FOR TITANIUM PRODUCTION

Meyer L. Freedman, Cleveland, Ohio, assignor, by mesne assignments, to Horizons Titanium Corporation, Princeton, N. J., a corporation of New Jersey No Drawing. Application February 10, 1955, Serial No. 487,471

2 Claims. (Cl. 204—64)

This invention relates to novel compositions of matter particularly useful in an electrolytic process for the recovery of metallic titanium. More particularly it refers to compositions which may be employed in the preparation of a fused electrolyte having a particularly low melting point in which the purification of impure titanium source material may be effected by electrolytic means.

One object of my invention is the preparation of a fused salt bath suitable for the electrorefining of titanium, and having a melting point of below 550° C. and preferably below 500° C.

Another object of my invention is a process for obtaining metallic titanium as a cathode deposit by means of an electrolysis carried out in a fused bath at temperatures below 550° C. and preferably below 500° C.

A further object of my invention is the preparation of two novel compounds of potassium, titanium and fluorine, from which the novel bath constituting one aspect of my invention may be prepared.

These and other objects will become readily apparent to those skilled in the art from the following specification and claims.

Fused compositions of various proportions of $TiF_4$ and $K_2TiF_6$ were prepared by rapidly melting mixtures of the two salts in a suitable furnace. A thermocouple inserted into the melt served as a stirrer. Cooling curves were obtained by allowing the melts to cool undisturbed with the thermocouple positioned near the bottom of the melt.

The following examples illustrate the preparation of specific compositions:

Example 1

A composition corresponding to 22% by weight of $TiF_4$ and 78% by weight of $K_2TiF_6$, was prepared by melting $TiF_4$ and $K_2TiF_6$ in a carbon tube enclosed in a thoria envelope in a vertical tube furnace. The $TiF_4$ was obtained in substantially pure form by the hydrofluorination of titanium tetrachloride. The $K_2TiF_6$ was purified by recrystallization of commercial grade $K_2TiF_6$, followed by vacuum drying to remove any water. A mobile, non-fuming melt was formed which solidified at 400° C. This composition corresponds to a eutectic and is the preferred composition of my invention.

Additional compositions were prepared by adding progressively increasing amounts of $TiF_4$ to $K_2TiF_6$. With a ratio of 5 mols of $K_2TiF_6$ to 1 mol of $TiF_4$ a novel compound having the formula $5KF \cdot 3TiF_4$ which melted at about 760° C. was found. With a ratio of 1 mol of $K_2TiF_6$ to 1 mol of $TiF_4$ a novel compound melting at about 540° C. and corresponding to the composition $KF \cdot TiF_4$ was discovered. Some of the compositions investigated between these two compositions are shown in the following table:

Table I

| $TiF_4$ | | $K_2TiF_6$ | | Liquidus, °C. | Solidus, °C. |
|---|---|---|---|---|---|
| Weight, Percent | Mol, Percent | Weight, Percent | Mol, Percent | | |
| 9.1 | 16 | 90.9 | 84 | 760 | -------- |
| 17.5 | 29.2 | 82.5 | 70.8 | 585 | 400 |
| 20 | 33.3 | 80 | 66.7 | 510 | 400 |
| 22 | 36 | 78 | 64 | 400 | 400 |
| 25 | 40 | 75 | 60 | 520 | 400 |
| 27.5 | 43.15 | 72.5 | 56.85 | 535 | 400 |
| 34.05 | 50 | 65.95 | 50 | 540 | -------- |

The foregoing data indicates that a eutectic composition is formed at a composition corresponding to 22% by weight $TiF_4$ and 78% by weight $K_2TiF_6$ and that compositions corresponding to between about 20% by weight $TiF_4$ plus 80% by weight $K_2TiF_6$ and about 25% by weight $TiF_4$ plus 75% by weight $K_2TiF_6$ all melt at temperatures well below 550° C.; generally below 500° C. In view of the low melting point of these compositions, it would appear that numerous benefits in operation could be realized by employing them as the electrolyte in a fused salt electrolysis in which an impure titanium anode is electrolytically dissolved and the titanium content is recovered in pure form as a cathode deposit.

The impure titanium anode may comprise any one of a wide variety of materials. Thus, it may be formed of impure metal in the form of ingots obtained by the reduction of titanium compounds. Alternatively, it may be in the form of titanium associated with limited amounts of oxygen, carbon, nitrogen, or combinations of these with or without any additional elements which combine interstitially with the titanium and may therefore be readily parted therefrom. Alternatively other impure titanium containing materials produced in either electric furnace, blast furnace, or in other pyrometallurgical processes may be employed as the anode provided the anode is electrically conductive. The following example is intended merely to illustrate one of such processes.

Example II

A fused bath approximating the aforesaid eutectic composition was prepared by rapidly melting a mixture consisting of 78 parts by weight of recrystallized $K_2TiF_6$ with 22 parts by weight of $TiF_4$ in a graphite crucible. Once the bath had melted, an anode of titanium carbide and a cathode composed of a metal which is not attacked by the bath, such as nickel or molybdenum were inserted into the melt. The electrolysis was conducted with the cell voltage maintained below about 3 volts and at a temperature of about 520° C. whereby the titanium content of the anode was continuously dissolved in the fused bath and a deposit of titanium was continuously obtained on the cathode, in substantially equal amounts. It will be readily appreciated that the electrolysis may be continuous by replacing the anode and the cathode from time to time.

By conducting the electrolysis at temperatures below 550° C., the heat input required to maintain the bath fluid is considerably less than that required when operating at temperatures of the order of 850° C. Furthermore, the cathode deposited metal is freer from contamination than metal obtained from fused salt electrolysis conducted at higher temperatures. Presumably, this is because the freshly deposited titanium is less susceptible to reaction with any of the system components at the lower temperature. Similarly because of the lower temperatures involved, other side reactions, e. g. possible reactions involving the metal or refractory, or cell components, with fluorine, carbon, oxygen, or water vapor are also minimized.

Although the electrolyte in the above specific example has been described as having been prepared from $TiF_4$ and $K_2TiF_6$, it will be readily apparent that similar mixtures of compositions closely approximating that of the eutectic may be formed from mixtures of two or more of the following: $5KF \cdot 3TiF_4$, $KF \cdot TiF_4$, $KF$, $K_2TiF_6$ and $TiF_4$ in various proportions, provided that the desired eutectic composition is obtained.

In addition to compositions comprising potassium, titanium and fluorine, as above described, I have found that fused baths having the described low melting point may be prepared by incorporating alkali metal chlorides, particularly KCl and NaCl into the eutectic compositions. The amount of chloride which may be added as a bath diluent is necessarily limited to amounts which do not materially raise the fusion temperature of the bath and is readily determinable by simple experiment. By such addition of an alkali metal chloride, it becomes possible to electrolyze the bath with other anodes than consumable anodes. Thus the bath may be electrolyzed with a carbonaceous anode with recovery from the complex fluorine compound of the titanium portion in the form of a crystalline cathode metallic deposit.

*Example III*

To a fused bath of the eutectic composition of Example II KCl was added in the proportion of 20 parts by weight KCl to 100 parts by weight of eutectic. The bath was melted and electrolyzed with a carbon anode and a nickel cathode in the same manner as in Example II. Titanium was deposited on the cathode in the form of large coarse crystals.

I claim:

1. In a process for electrolytically recovering titanium metal as a cathode deposit, in which a direct current potential is impressed across an anode and a cathode in electrical contact with a fused salt electrolyte and titanium is deposited at the cathode, the improvement which comprises: forming the electrolyte of a eutectic composition of compounds of potassium, titanium and fluorine which melts below 550° C. and in which the proportions correspond to about 22% by weight of $TiF_4$ and 78% by weight of $K_2TiF_6$.

2. In the process of claim 1 the additional improvement which comprises: incorporating at least one alkali metal chloride in said eutectic composition in an amount insufficient to raise the melting point of the resulting mixture above 550° C.

References Cited in the file of this patent

UNITED STATES PATENTS 2,500,792   Blythe et al. _____ Mar. 14, 1950

OTHER REFERENCES

Kroll et al.: "Bureau of Mines Report of Investigations, RI 4915," November 1952, pages 17 thru 21.

Weight Air Development Center Technical Report WADC 53–317, "Electrodeposition of Titanium and Zirconium," December 1953, title page relied on.